United States Patent
Schmitz

(10) Patent No.: US 8,915,546 B2
(45) Date of Patent: Dec. 23, 2014

(54) LOCKING DEVICE, IN PARTICULAR FOR A CRASH-ACTIVE HEAD RESTRAINT OF A VEHICLE

(75) Inventor: Adreas Schmitz, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 1209 days.

(21) Appl. No.: 12/741,813

(22) PCT Filed: Nov. 21, 2008

(86) PCT No.: PCT/EP2008/009896
§ 371 (c)(1),
(2), (4) Date: Apr. 11, 2012

(87) PCT Pub. No.: WO2009/065603
PCT Pub. Date: May 28, 2009

(65) Prior Publication Data
US 2012/0207540 A1    Aug. 16, 2012

(30) Foreign Application Priority Data

Nov. 23, 2007   (DE) .......................... 10 2007 056 810
Mar. 3, 2008    (DE) .......................... 10 2008 012 217

(51) Int. Cl.
*B60R 21/00*    (2006.01)
*B60N 2/48*    (2006.01)

(52) U.S. Cl.
CPC ............ *B60N 2/4864* (2013.01); *B60N 2/4885* (2013.01)
USPC ..................................... 297/216.12; 279/391

(58) Field of Classification Search
CPC ...... B60N 2/42; B60N 2/427; B60N 2/42727; B60N 2/4808; B60N 2/4864; B60R 21/00
USPC .............................. 297/216.12, 391, 404, 409
See application file for complete search history.

(56) References Cited

U.S. PATENT DOCUMENTS

| 6,942,292 B2 * | 9/2005 | Low et al. ................ 297/216.12 |
| 8,029,055 B2 | 10/2011 | Hartlaub |
| 2008/0272631 A1 * | 11/2008 | Hartlaub .................. 297/216.12 |

(Continued)

FOREIGN PATENT DOCUMENTS

| DE | 19923909 A1 | 1/2000 |
| DE | 10348939 B3 | 1/2005 |

(Continued)

OTHER PUBLICATIONS

International Search Report for application No. PCT/EP2008/009896 mailed Mar. 27, 2009.

(Continued)

Primary Examiner — Philip Gabler
(74) Attorney, Agent, or Firm — Fletcher Yoder, P.C.

(57) ABSTRACT

A locking device is disclosed, such as for head restraint of a vehicle seat. The head restraint has a first subsection that may be displaced from a first position in a direction of displacement into a comfort position. Relative movement of a second subsection relative to the first subsection and/or relative to a third subsection is provided about a rotational axis substantially parallel to the direction of displacement. A blocking device and a sliding device are arranged between the first and second subsections and/or between the second and third subsections.

18 Claims, 12 Drawing Sheets

(56) References Cited

U.S. PATENT DOCUMENTS

2011/0084524 A1* 4/2011 Werner ............... 297/216.12
2011/0109131 A1* 5/2011 Frose et al. ........... 297/216.12
2011/0272977 A1* 11/2011 Froese et al. ......... 297/216.12

FOREIGN PATENT DOCUMENTS

| | | | |
|---|---|---|---|
| DE | 10 2004 016474 | * | 8/2005 |
| DE | 102004016474 B3 | | 8/2005 |
| DE | 102005052766 B3 | | 3/2007 |
| FR | 2891215 A1 | | 3/2007 |
| JP | 2007530357 | | 11/2007 |
| WO | 2009030414 A | | 3/2009 |

OTHER PUBLICATIONS

Japanese Examination Report dated Dec. 19, 2012.

* cited by examiner

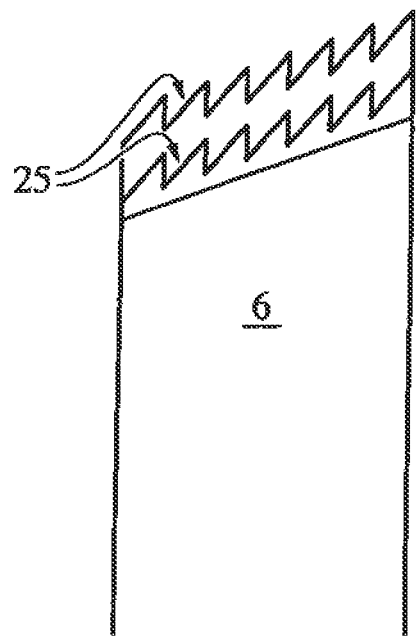
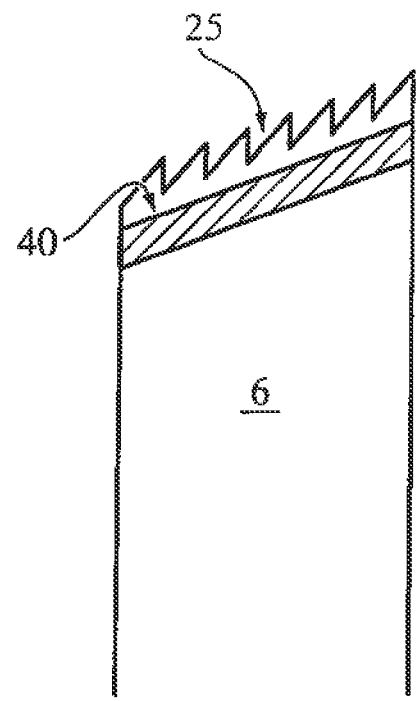
Fig. 5    Fig. 6
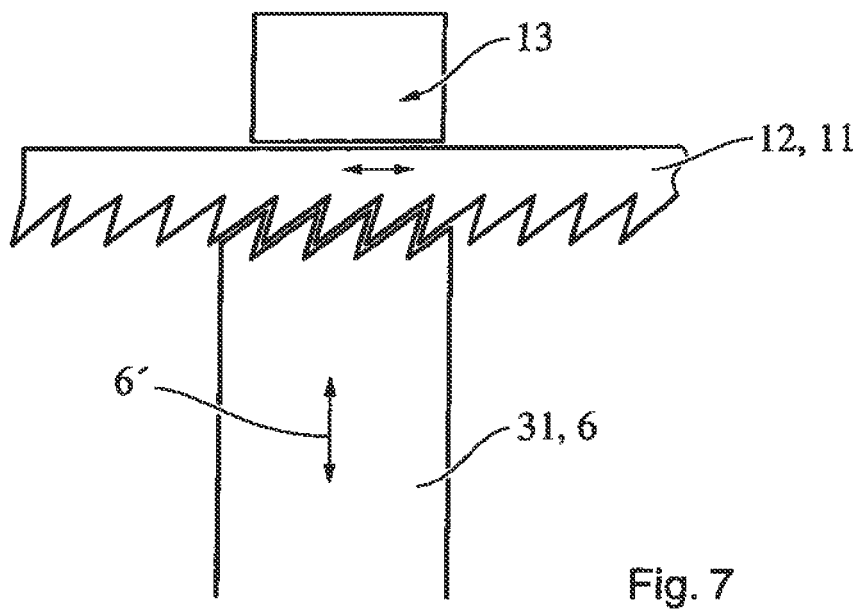
Fig. 7

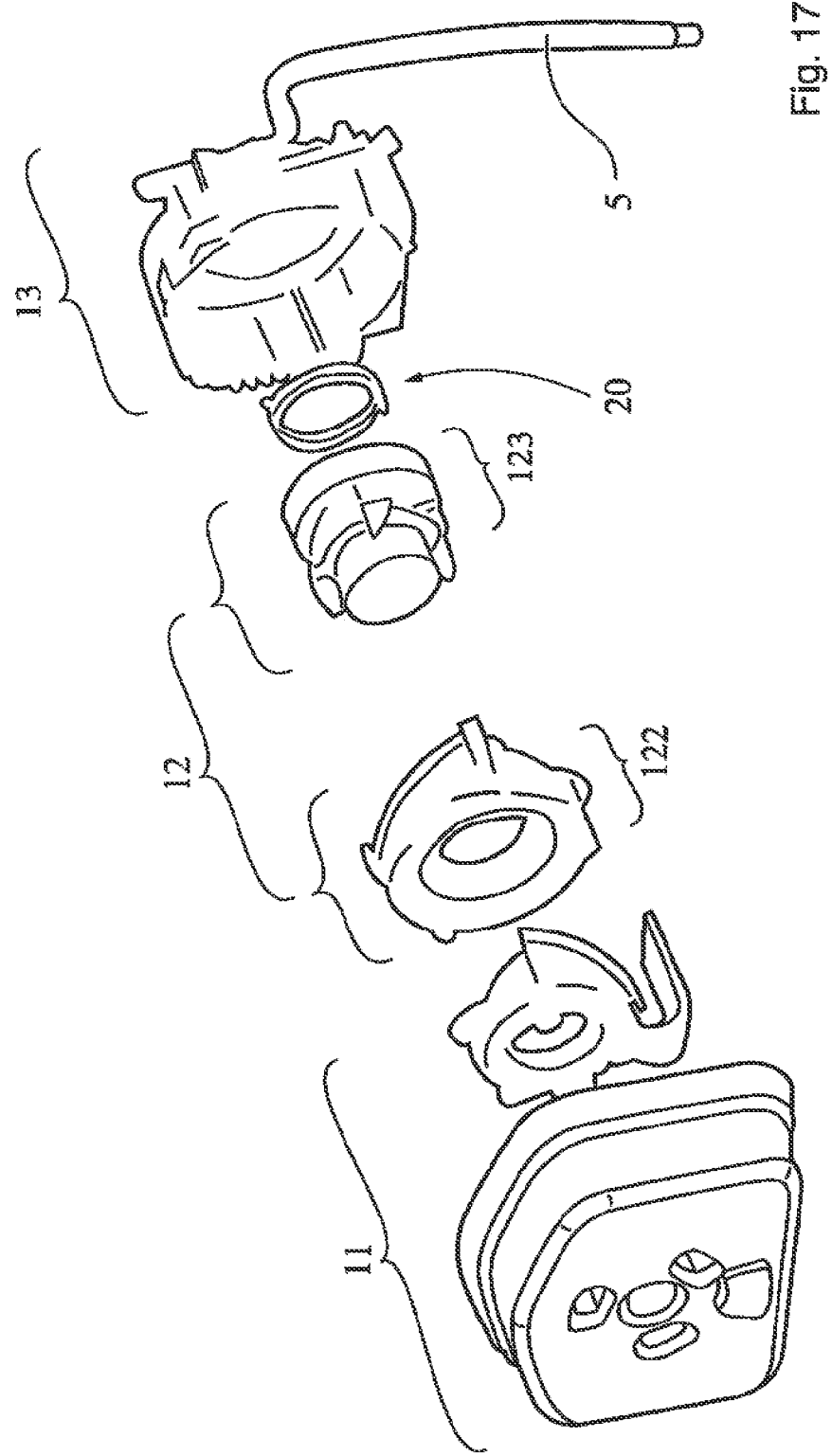

LOCKING DEVICE, IN PARTICULAR FOR A CRASH-ACTIVE HEAD RESTRAINT OF A VEHICLE

CROSS REFERENCE TO RELATED APPLICATIONS

This application claims priority from and the benefit of PCT Application No. PCT/EP2008/009896, filed on Nov. 21, 2008; German Patent No. DE 10 2007 056 810.1, filed on Nov. 23, 2007; and German Patent DE 10 2008 012 217.3, filed on Mar. 3, 2008; all entitled "Locking Device, in Particular for a Crash-Active Head Restraint of a Vehicle", which are herein incorporated by reference.

BACKGROUND

The invention relates to a locking device for the releasable locking of one component relative to another in one of a plurality of possible relative positions, in particular for a crash-active head restraint of a vehicle.

Such a locking may be carried out in the prior art by a toothed portion into which a bolt positively engages at various positions. Such bolts are generally tensioned by spring force in the direction of the toothed portion. During adjustment, the bolt may be lifted counter to the spring force, so that the locking is released and an adjustment of the relative position may take place. Optionally, the adjustment may also be undertaken without lifting the bolt, provided the inclination of the tooth flanks is correspondingly flat. Moreover, the bolt and toothed portion may be designed to be asymmetrical such that an adjustment in one direction is also possible when the bolt is not released, whilst an adjustment in the opposite direction requires a release of the bolt. In particular (but not only) in the last-mentioned locking devices a rattling noise may be produced during adjustment without prior release of the bolt, which has a troublesome effect. Moreover, as a result, increased wear may occur on the bolt and toothed portion. A head restraint is further disclosed in the publication DE 199 23 909 A1, which consists of a base body connected rigidly to the backrest of the vehicle seat via retaining bars, optionally also in a height-adjustable manner, which is arranged in a padded segment formed in the manner of a trough. In the event of an accident, the padded segment is moved in a translatory manner toward the head of the seat occupant in order to prevent whiplash injury. The force required therefor is produced by a spring pretensioned in the direction of displacement within a telescopic guide device. Head restraints are further disclosed in the publications DE 10 2004 016 474 B3, DE 103 48 939 B3 and DE 10 2005 052 766 B3.

SUMMARY

The object of the invention is to provide a locking device, in particular for a head restraint for a vehicle seat, the aforementioned drawbacks being avoided. In particular, in a normal usage situation optimal ease of use is intended to be ensured and noise generation when adjusting the head restraint avoided or reduced and optionally in the event of an accident optimal safety for a seat occupant is intended to be ensured.

The object is achieved by a locking device, in particular for a head restraint for a vehicle seat, the locking device comprising a first subsection, which may be displaced from a use position in a direction of displacement into a comfort position, a relative movement of a second subsection relative to the first subsection and/or relative to a third subsection being provided about a rotational axis substantially parallel to the direction of displacement and, moreover, both a blocking device and a sliding device being arranged between the first subsection and the second subsection and/or between the second subsection and the third subsection. As a result, advantageously a robust and reliable mechanism may be produced, which is provided for adjusting the comfort and/or for adjusting the safety of the head restraint and/or of the first subsection of the head restraint, and which during an adjustment generates no noise or only generates a small amount of noise. Moreover, as a result it is advantageously possible that the locking device comprises both predominantly positive and predominantly frictional locking means, for example the locking at base load or a lower operating load taking place predominantly frictionally and with an increased operating load predominantly positively. In this connection, the predominantly frictional locking means at base load or a lower operating load, are designed in particular to be compressible, preferably elastically compressible, and with an operating load acting on the components may be deformed such that the predominantly positive locking means are brought into engagement. Such a locking device is able to be used particularly advantageously when adjusting the comfort-depth of a crash-active head restraint, which is disclosed in the German patent application DE 10 2007 041 498.8. Reference is expressly made to the entire disclosure therein and, in particular, the description of the toothed oblique surfaces (last paragraph of the description).

According to the invention, it is particularly preferred that in the state without the action of force on the part of the user on the first subsection only the action of the sliding device is provided, the locking device comprising a spring such that a force threshold is provided and that when exerting a first force acting on the first subsection counter to the direction of displacement above the force threshold, the action of the blocking device is provided. According to this alternative, in the normal case, i.e. without a substantial action of force on the part of the user on the first subsection, the sliding device acts, so that advantageously an adjustment with reduced noise is possible. Moreover, according to the invention it is alternatively particularly preferred that in the state without the action of force on the part of the user on the first subsection, at least the action of the blocking device is provided, the locking device comprising a spring such that a force threshold is provided and that when exerting a second force acting on the first subsection parallel to the direction of displacement above the force threshold the action of the blocking device is canceled. According to this alternative, in the normal case, i.e. without a substantial action of force on the part of the user on the first subsection, at least the blocking device acts, so that advantageously a secure positioning of the first subsection is ensured and only when the user pulls on the first subsection (in the direction of displacement to the front) with the second force is the action of the blocking device not present.

Moreover, it is preferred according to the invention that the first subsection has at least one first oblique surface and the second subsection has at least one second oblique surface, the first and/or second oblique surfaces extending substantially helically about the rotational axis and with a relative movement of the second subsection about the rotational axis effect a movement of the first subsection in the direction of displacement and/or that the second subsection is provided arranged between the first subsection and a third subsection, the third subsection comprising at least one third oblique surface and the second subsection comprising at least one fourth oblique surface, the third and/or fourth oblique surfaces extending substantially helically about the rotational axis and with a relative movement of the second subsection about the rotational axis effect a movement of the second subsection in the direction of displacement. As a result, according to the invention in a simple manner the linear movement of the first subsection corresponds to the relative rotational movement of the second subsection.

Moreover, according to the invention it is preferred that the blocking device and the sliding device are provided to extend substantially adjacent to one another along the first oblique surface and/or along the second oblique surface and/or along the third oblique surface and/or along the fourth oblique surface, in particular are provided to extend adjacent to one another along a periphery about the rotational axis, and in particular are provided offset in the axial direction relative to the rotational axis. As a result, the blocking device and the sliding device may be produced in a particularly structurally compact manner.

Moreover, according to the invention it is also preferred that the spring is provided in the region of the first oblique surface and/or in the region of the second oblique surface and/or in the region of the third oblique surface and/or in the region of the fourth oblique surface on the side opposing the blocking device in the axial direction. As a result, according to the invention it is possible in a simple manner to use the component tolerances for switching the action of the blocking device.

According to the invention it is further preferred that the blocking device is provided for blocking or reducing a movement of the first subsection counter to the direction of displacement, the blocking device comprising a toothed portion in the region of the third oblique surface and the fourth oblique surface and/or a toothed portion in the region of the first oblique surface and the second oblique surface. As a result, advantageously a particularly simple blocking may be implemented by a positive connection between two toothed portions.

Moreover, it is also provided according to the invention that the blocking device has at least one blocking pin, in particular the blocking pin being provided pretensioned by a spring in the normal case, and/or when exerting a second force acting on the first subsection parallel to the direction of displacement above the force threshold, in particular, the blocking pin being provided actuated. As a result, it is possible by simple means, by means of a relatively small adjustment path of the first subsection parallel to the direction of displacement (i.e. to the front) to produce a large increase in the distance between the toothed portions of the blocking device in engagement with one another. As a result, the operation of a head restraint according to the invention is simplified and of more comfortable design.

Moreover, it is preferred according to the invention that the second subsection has a comfort subsection and a safety subsection, the comfort subsection being able to be moved away from the position of the safety subsection for comfort adjustment starting from a position corresponding to the use position of the first subsection, in particular the comfort subsection being able to be adjusted for comfort adjustment into a position corresponding to the safety position of the first subsection irrespective of the position of the safety subsection. As a result, in a simple manner a robust and reliable mechanism is provided both for adjusting the comfort and for adjusting the safety of the head restraint and/or of the first subsection of the head restraint.

Moreover, it is preferably provided according to the invention that between the first subsection and the second subsection and/or between the second subsection and the third subsection and/or between the first subsection and the third subsection a tolerance compensation device is provided. As a result, it is advantageously possible, by simple means, to implement tolerance compensation and optionally also a stop protection with a corresponding noise reduction.

A further subject of the present invention relates to a head restraint for a vehicle seat comprising a locking device according to the invention, the first subsection facing the head of the seat occupant and the direction of displacement being provided in the direction of the head of the seat occupant.

A further subject of the present invention relates to a locking device, in particular for a head restraint for a vehicle seat, a fifth subsection being able to be adjusted from a normal position into a safety position, a fourth subsection being provided which may be rotated about a substantially horizontal rotational axis relative to the fifth subsection, which may be displaced for comfort purposes between an initial position and an end position, a clamping element and a counter element being provided in order to block the fourth subsection in any position between the initial position and the end position relative to a movement in the direction of the initial position. As a result, according to the invention in a particularly advantageous manner it is possible that a comfort adjustment is possible without latching positions, i.e. substantially continuously.

DRAWINGS

Embodiments of the invention are shown in the drawings and explained in more detail in the following description.

FIGS. 1 to 14 show various embodiments and/or details of the locking device according to the invention and/or of known locking devices.

Figure 16A:
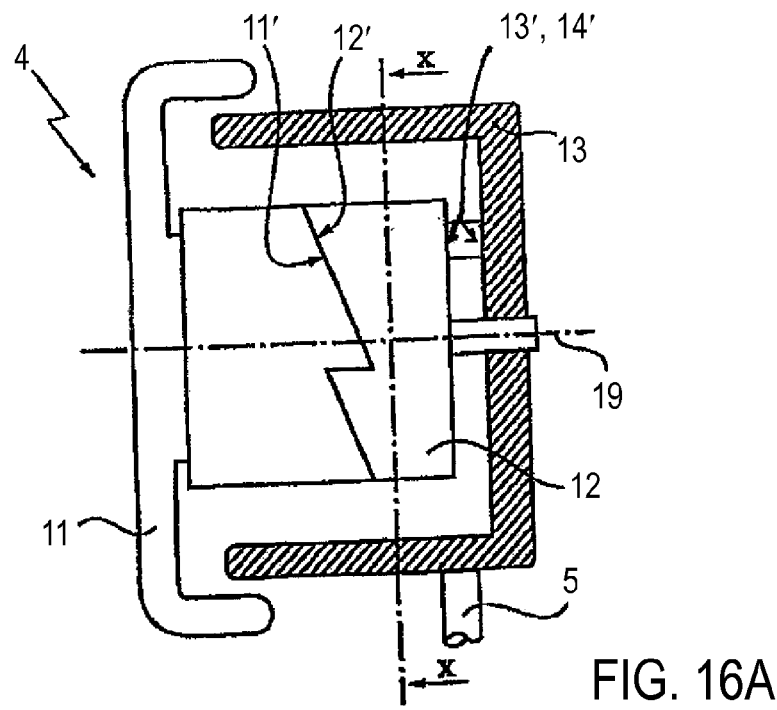
Figure 16B:
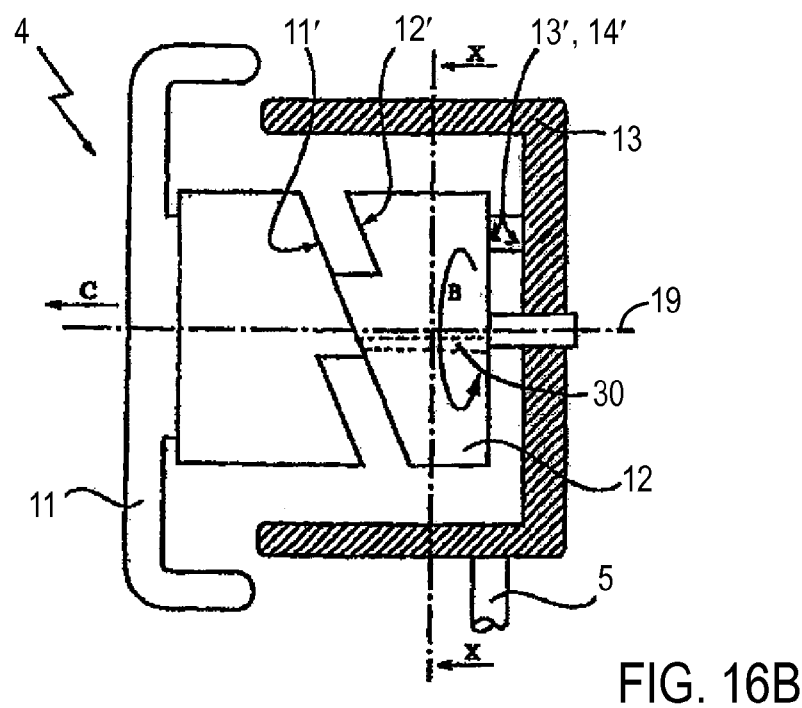

FIGS. 16a and 16b schematically show detailed views, and FIG. 17 shows an exploded view of the head restraint.

Figure 18:
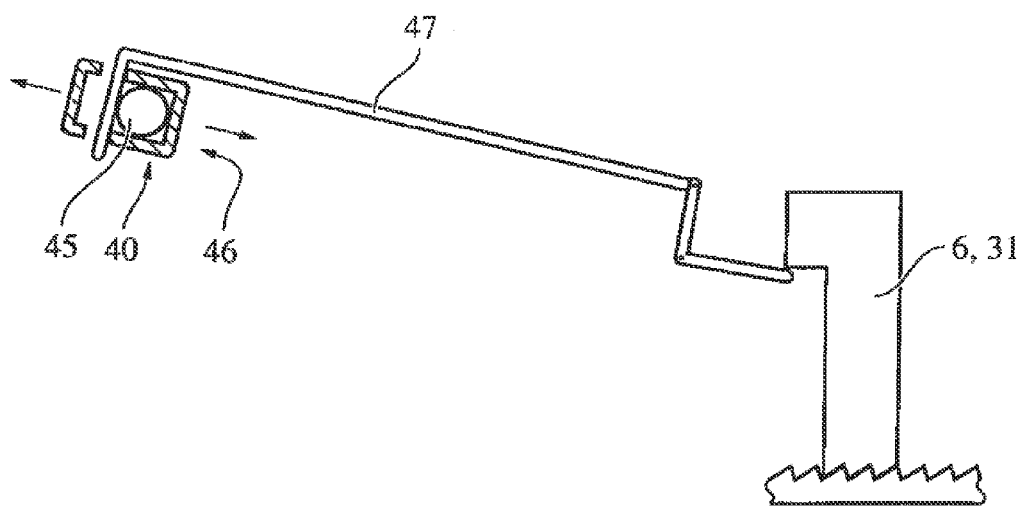
Figure 19:
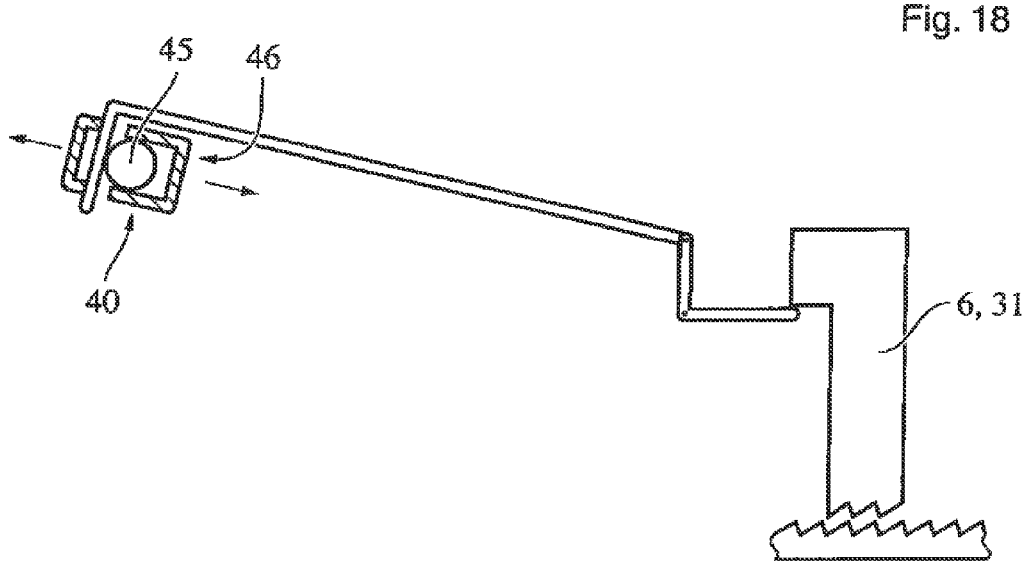

FIGS. 18 and 19 show further modifications of the locking device 1 according to the invention.

FIGS. 20 to 26 show further details of a head restraint according to the invention comprising an element and/or subsection which may be continuously adjusted for the purposes of comfort.

DETAILED DESCRIPTION

Figure 15:
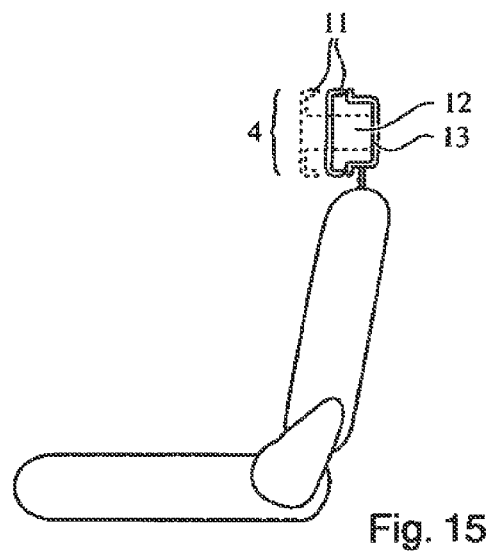
FIG. 15 shows a vehicle seat comprising a head restraint.

According to FIG. 15 a vehicle seat and/or a vehicle seat provided with a headrest 4 according to the invention comprises a seat part 2 and a backrest 3 connected thereto, in particular in a manner in which the inclination may be adjusted, and which is provided with the headrest 4. Pairs of retaining bars 5 may be provided for fastening the headrest to the backrest 3. However, alternatively other fastening options (not shown) may also be provided between the backrest 3 and the headrest 4. The pairs of retaining bars 5 of the headrest 4 may be connected pivotably in the upper region of the backrest 3 or in the region of the headrest 4 via an articulation (not shown) to the backrest 3 and/or to the headrest 4. According to the invention, the headrest 4 comprises at least one first subsection 11 of the headrest 4 facing the head of the seat occupant, which according to a preferred embodiment and as a result of an accident may be displaced under the action of a relative movement of a second subsection 12 of the headrest 4 arranged substantially between the first subsection 11 and a third subsection 13, from a use position (illustrated by solid lines in FIG. 15) toward the head of the seat occupant in a direction of displacement into a safety position (illustrated by dotted lines in FIG. 15). A corresponding displacement of the first subsection 11 is, according to the present invention, provided by the possibility of adjusting the comfort. The first subsection 11 is, in particular, a padded element on which the head of the seat occupant may be rested and/or supported. The third subsection 13 of the headrest 4 is, in particular, a base body of the headrest 4, which is rigidly connected to the backrest 3 via the retaining bars 5 or also in a manner in which the height and/or inclination may be adjusted.

According to FIGS. 16a and 16b the relative movement of the subsections 11, 12, 13 of the head restraint according to the invention 4 is shown schematically in more detail. In this case, FIG. 16a shows the state of the head restraint in the use position and FIG. 16b shows the state of the head restraint in the safety position and/or in the comfort position, i.e. after a displacement to the front (according to the arrow C) of the first subsection 11 in the direction of the seat occupant. This displacement to the front is effected by a relative rotation of the second subsection 12 about a rotational axis 19. Oblique surfaces rubbing against one another and/or mounted on top of one another between the first subsection 11 and the second subsection 12 and/or between the second subsection 12 and the third subsection 13 produce an axial force and a displacement to the front of the first subsection 11 parallel to the direction of the rotational axis 19 in the direction of displacement C. The front surfaces of the first subsection 11 denoted by 11' and 12' and facing one another (subsequently also denoted as first oblique surfaces 11') and/or of the second subsection 12 (subsequently also denoted as second oblique surfaces 12') are configured according to the invention as oblique surfaces such that the rotational movement of the second subsection 12 is translated into a translatory movement of the first subsection 11 and vice versa. A blocking device 30 (only indicated schematically in FIG. 16b) may be provided according to the invention so that a part or all of these first and second oblique surfaces 11', 12' are provided with—for example, saw-tooth-like—toothed portions, which permit a blocking of the first subsection 11 in its entirely or partially extended position according to the direction of movement C, if a force acts on the first subsection 11 moving back said first subsection into the use position (for example after or during an accident, starting from the head of the vehicle occupant). Third and fourth oblique surfaces (indicated only schematically in FIGS. 16a and 16b) may also be provided between the second subsection 12 and the third subsection 13 (alternatively or additionally to their arrangement between the first subsection 11 and the second subsection 12). Accordingly, alternatively or additionally to the blocking device 30 in the region of the first and second oblique surfaces 11', 12' a similarly constructed blocking device may be provided in the region of the third and fourth oblique surfaces 13', 14'. According to the present invention, it is provided that the displacement of the first subsection 11 is possible in the direction of displacement C in an accident situation and/or for comfort purposes. In an embodiment shown in FIG. 17, the displacement path in the direction of displacement for comfort purposes and the displacement path for adjusting the safety position entirely overlap. This may be implemented according to the invention, for example, such that the second subsection 12 comprises a comfort subsection 122 and a safety subsection 123, by means of a rotation of the comfort subsection 122 about the rotational axis 19 starting from the use position or starting from a comfort position a movement of the first subsection 11 being provided in the direction of displacement C and by means of a rotation of the safety subsection 123 about the rotational axis 19 an at least partially combined movement of the comfort subsection and a movement of the first subsection 11 being provided in the direction of displacement C. For the purposes of a simpler view, the comfort subsection 122 and the safety subsection 123 are merely shown in the exploded view according to FIG. 17, but not shown in FIGS. 16a and 16b.

Viewed in the direction of displacement C, the oblique surfaces 11', 12', 13', 14' may be configured to be at least partially helical. The oblique surfaces may also be formed, for example, three times along a periphery, for example, of the comfort subsection 122, so that a maximum rotation of the comfort subsection 122 of up to 120° results, generally of approximately 70° to approximately 110°. According to the invention, a movement of the first subsection 11 counter to the direction of displacement C (i.e. away from and/or to the rear of the head of the occupant) is not possible in an unrestricted manner, but is blocked. To this end, the locking device 1 according to the invention is provided and/or the head restraint 4 according to the invention has such a locking device 1. The locking device 1 has the blocking device 30 which hinders an opposing movement away via dead travel counter to the direction of displacement C of the first subsection 11. According to the invention, however, excessive noise in the locking device 1 when adjusting the comfort is intended to be prevented by the toothed portion of the blocking device 30. The blocking device 30 according to the invention is provided, for example, in the form of a toothed portion in the region of the third and fourth oblique surfaces 13', 14' and/or in the region of the first and second oblique surfaces 11', 12'. To this end, at least one pair consisting of a helical oblique surface and a non-helical oblique surface is provided with teeth, i.e. of for example three oblique surfaces distributed over the periphery only one is provided with teeth. In the embodiment it is further provided that the toothed surface, for example the third oblique surface 13' may be lifted, for example, by means of a blocking pin 31 optionally pretensioned by a spring from the toothed engagement provided in the normal case with the fourth oblique surface 14' (whereby the blocking action of the blocking device 30 may be canceled) or the blocking pin 31 in the normal case (i.e. with relatively low forces on the first subsection 11) is not provided in toothed engagement but merely in frictional engagement with the fourth oblique surface 14' (so that greater forces, i.e. above a force threshold on the first subsection 11 in a direction counter to the direction of displacement C result in a blocking by toothed engagement). This is explained in more detail hereinafter with reference to FIGS. 1 to 14.

Figure 1A:
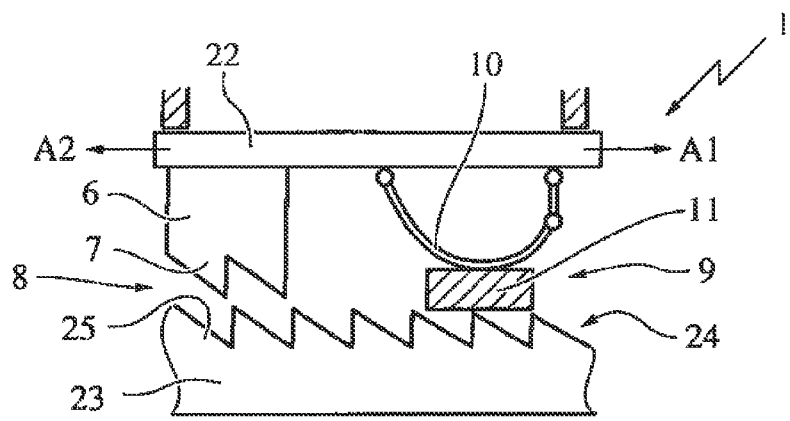

FIG. 1a shows a locking device 1 according to the invention comprising a first component 22 and a second component 23, which may be adjusted relative to one another in the longitudinal direction (arrows A1, A2). The first and second components 22, 23 correspond in this case, for example, to the first and second subsections 11, 12 and/or the second and third subsections 12, 13, in particular in the region of the oblique surfaces 11', 12', 13', 14'. The second component 23 is provided with an asymmetrical toothed portion 24 with teeth 25 formed in the manner of a ramp on one side. On the first component 22 a complementary-shaped bolt 6 with teeth 7 is provided (and for example corresponding to the blocking pin 31), which may be positively inserted in various relative positions into the toothed portion 24 and produce relatively high locking forces (positive locking means 8). Additionally, the locking device 1 has a predominantly frictionally-acting locking means 9 which consists of a leaf spring 10 arranged on the first component 22 and a substantially smooth friction block 110, which bears against the toothed portion 24. The friction block 110 may be lifted manually from the toothed portion 24 for releasing the locking. The first component 22 is, moreover, displaceably mounted relative to the second component 23 not only in a displaceable manner in the transverse direction (arrows A1, A2) but also counter to the direction of force of the leaf spring 10 in the direction of the arrow C' (i.e. counter to the direction of displacement C) toward the second component 23.

The mode of operation is thus as follows: during the displacement of the first component 22 relative to the second component 23 in the direction of the arrow A2 the friction block 110 slides substantially without noise over the ramps of the teeth 25 and only exerts a small, almost exclusively frictional resistance against the adjustment. With an adjustment in the direction of the arrow A1, the resistance is markedly increased due to the asymmetrical tooth shape of the toothed portion 24. An adjustment thus oriented generally requires a release of the locking by lifting the friction block 110 from the toothed portion 25. The frictional locking means 9 is suitable for preventing undesired adjustment, in particular in the direction of the arrow A1 at base load (i.e. a relatively small action of force counter to the direction of displacement C) or even a small additional operating load, in particular vibrating loads.

Figure 1B:
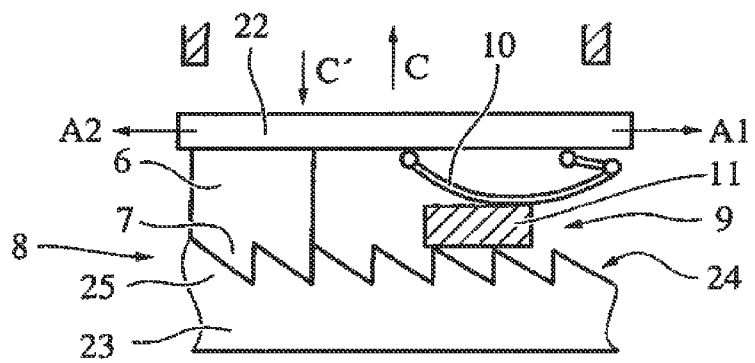
Figure 2:
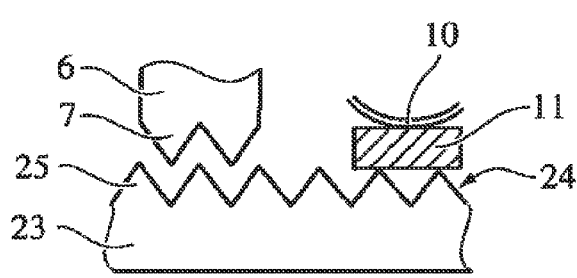
Figure 3:
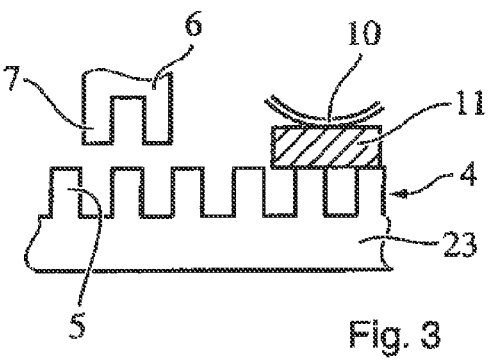

With an increased operating load, the first component 22 as a result of a corresponding loading direction or by using load deflection means in the direction of the arrow C' is moved toward the second component 23, the leaf spring 10 being deformed in an elastically compressible manner (FIG. 1b). As a result, the bolt 6 is brought into engagement with the toothed portion 24 and positively locks the movement, the action in the direction of the arrow A1 being particularly great. When the increased operating load is reduced, the leaf spring 10 lifts the bolt 7 up again and returns the system to the state according to FIG. 1a.

The toothed portion 24 may naturally also comprise teeth with a symmetrical triangular profile (see FIG. 2), rectangular teeth (see FIG. 3) or other tooth shapes.

Figure 4A:
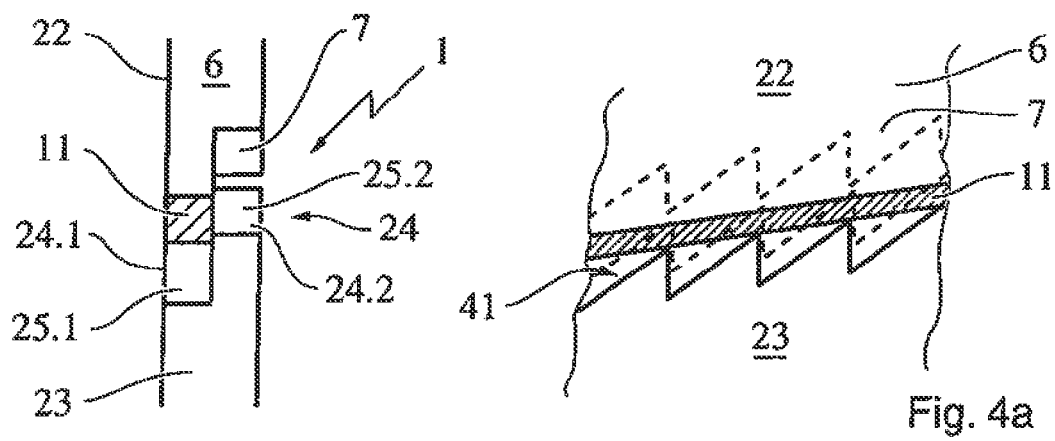
Figure 4B:
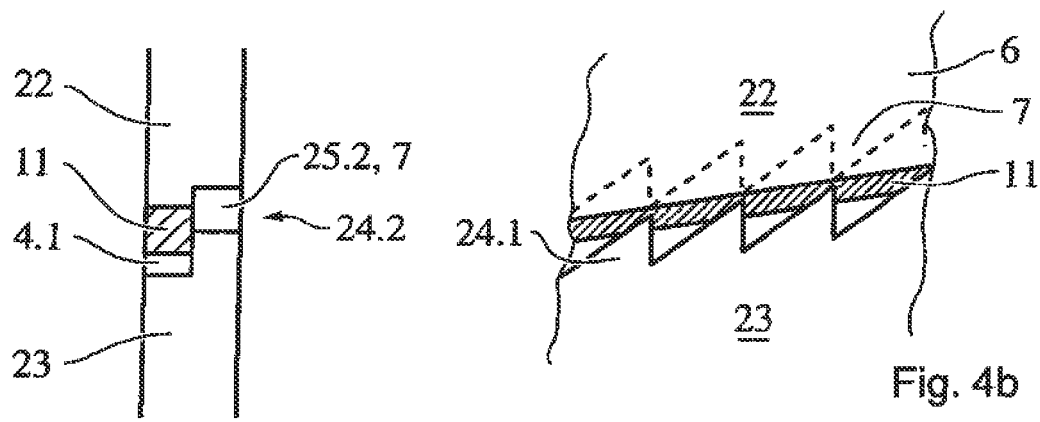

In the embodiment according to FIG. 4a (side view and cross-section), two helical toothed portions 24.1, 24.2 are provided adjacent to one another but offset vertically relative to one another. The bolt 6 has a corresponding counter-contour, the already elastically compressible friction block 110 already acting at base load on the toothed portion 24.1 and the teeth 7 of the bolt 6 overlapping the toothed portion 24.2 but at a distance therefrom.

With an increased operating load (FIG. 4b) the friction block 110 is forced into the toothed portion 24.1 and already deploys there a specific positive locking action. In particular, however, the teeth 7 of the bolt 6 are brought into a positive connection with the toothed portion 24.2 and secure the position of the components 22 and 23 relative to one another, in particular in the direction of the arrow A1.

Figure 13:
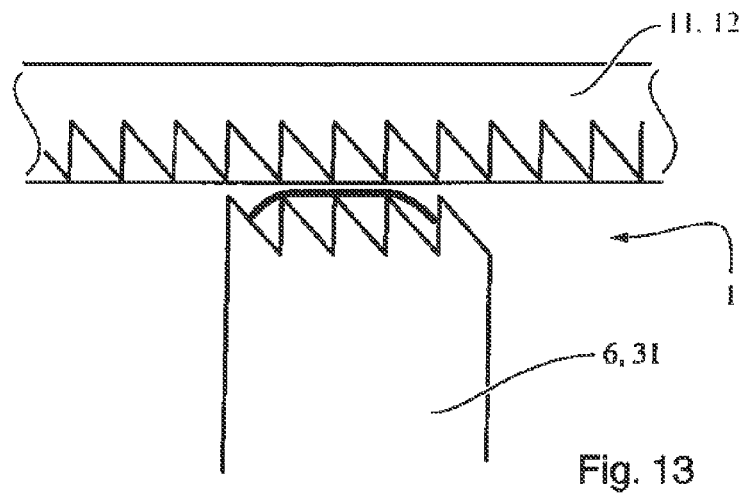
Figure 14:
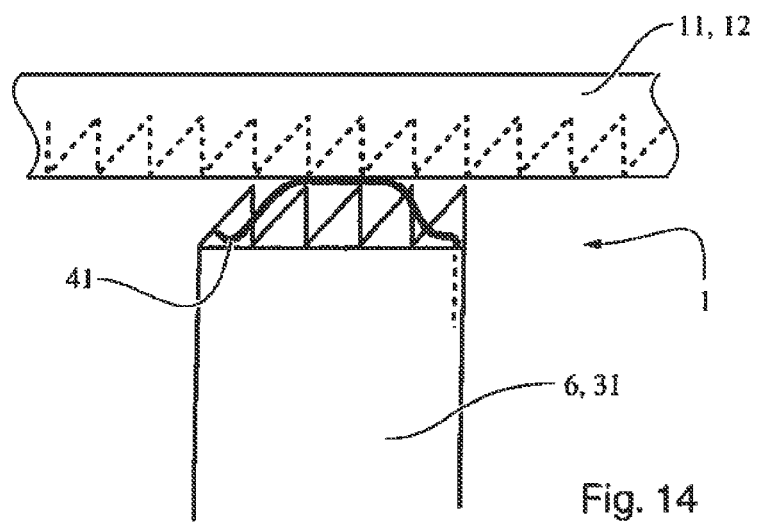

In FIG. 5 is a further example of an embodiment of the bolt 6 with two toothed portions 25. In FIG. 6, is an example of an embodiment of the bolt 6 with, on the one hand, a toothed portion 25 (as a blocking device 30) which, engaging in a corresponding toothed portion either of the first subsection 11 or of the second subsection 12, is able to prevent a movement of said subsection 11, 12 and, on the other hand, a rubberized surface (as a sliding surface and/or as a sliding device 40). According to the invention, it may be provided that either below the rubberized surface a spring device is provided as a metal spring or as resilient foam, or even the rubberized surface is provided so that with a sufficiently large first force on the first subsection 11, the rubberized surface is compressed such that the blocking device 30 (i.e. the toothed portions) are brought into engagement with one another. The opposing side of the rubberized surface may also comprise a rubberized surface or be designed as a spring 41, as is shown in FIGS. 13 and 14. The spring 41 is thus in constant contact with the sliding surface and/or frictional surface of the opposing side.

FIG. 7 shows a conventional locking of the movement of the first subsection 11 or of the second subsection 12 by means of a blocking pin 31 and/or bolt 6, for example relative to the third subsection 13, as for example is disclosed in the German patent application DE 10 2007 041 498.8. The bolt 6 is movable according to the arrow 6' and either releases the movement (toothed portion without engagement) or not (toothed portion in engagement shown in FIG. 7).

Figure 8:
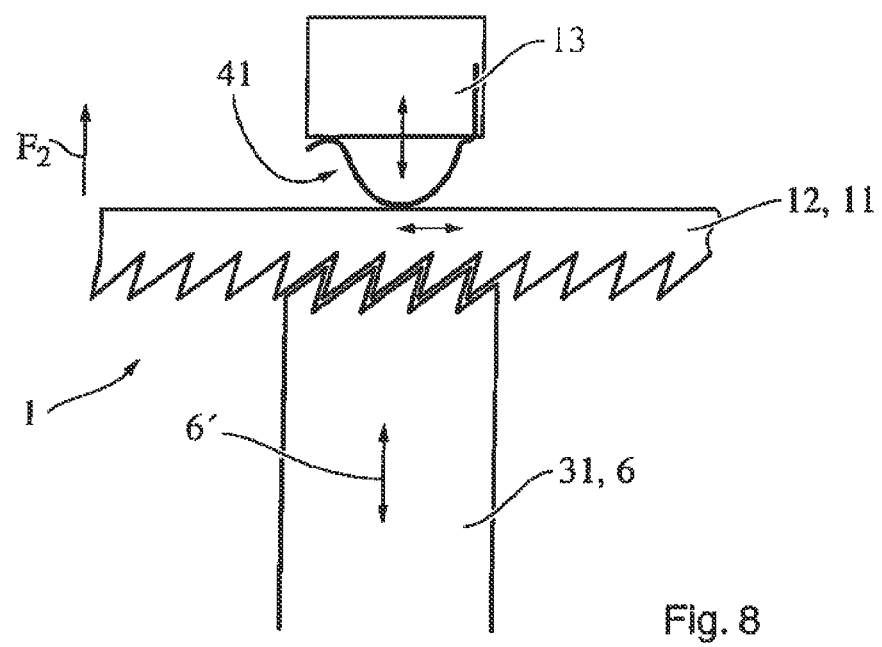

In the view according to FIG. 8, an embodiment according to the invention of the locking device is shown, in which a spring 41 is arranged opposing the sliding device 40 between the third subsection 13 and the first subsection 11 or the second subsection 12 of the blocking device 30 (in the form of the toothed portions in engagement) in the axial direction (i.e. substantially parallel to the direction of displacement). If a second force F2 is exerted on the first subsection 11 (and/or the second subsection 12) parallel to the direction of displacement and counter to the action of the spring 41, the toothed portions are brought out of engagement and an adjustment may be effected (without noise or at least substantially without noise).

Figure 9:
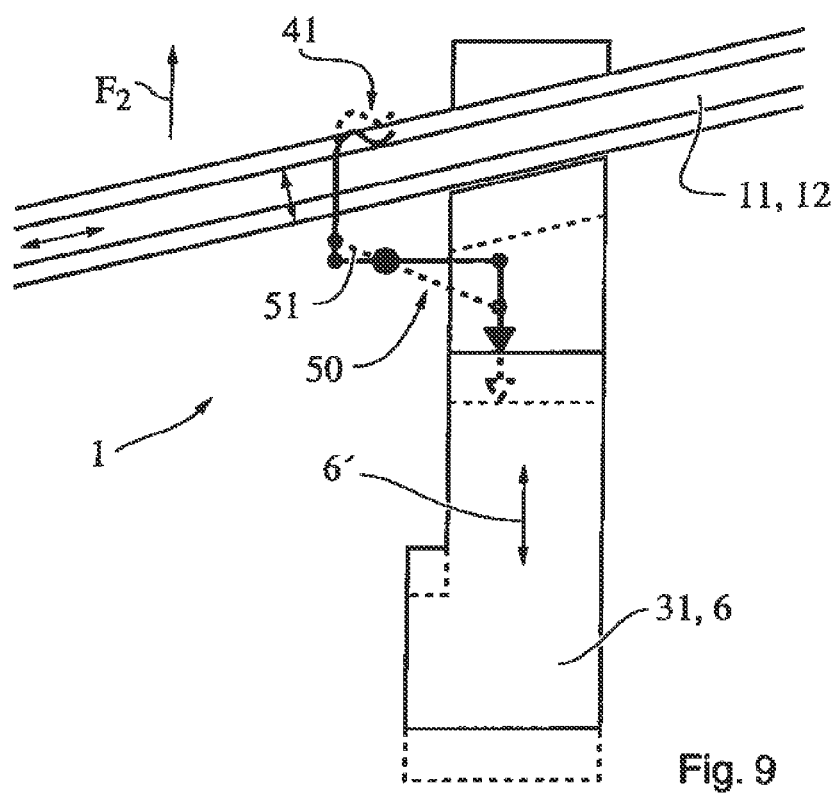
Figure 10:
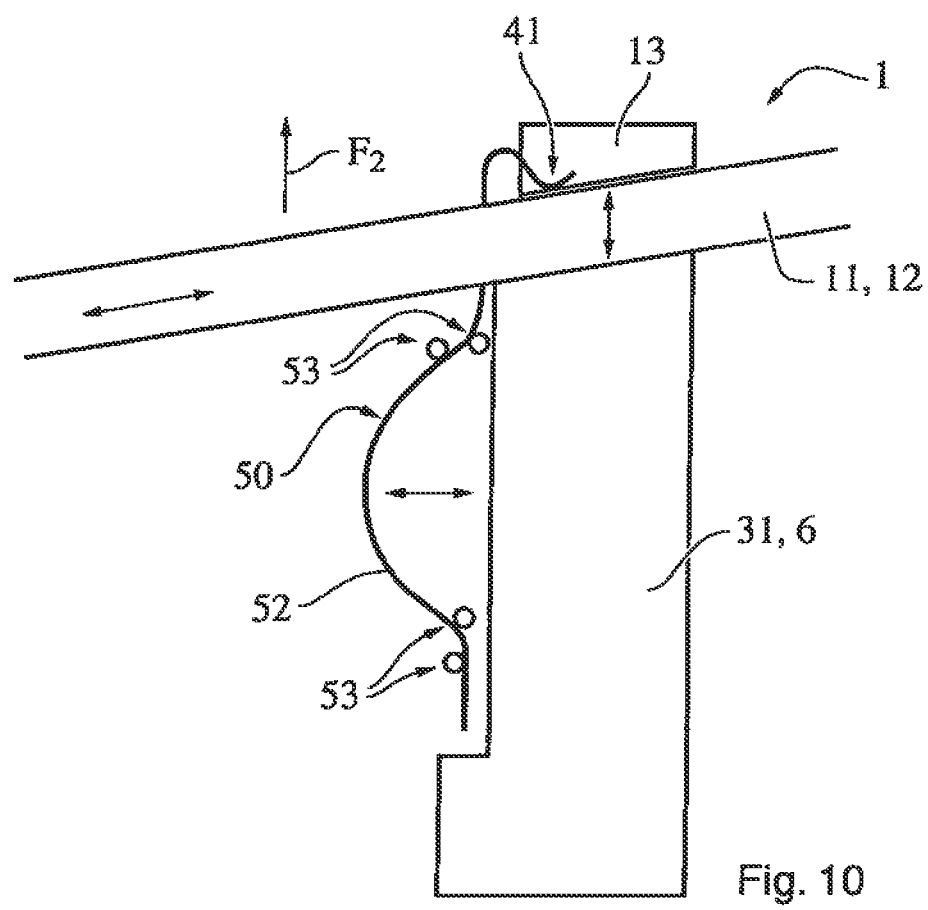

In FIGS. 9 and 10, modifications of the locking device according to the invention according to FIG. 8 are shown, a relative movement being effected in addition to the spring action of the spring 41 by means of a transmission device 50 in the sense of an unlocking and/or a pulling back of the bolt and/or the blocking pin 31. The transmission device 50 according to the embodiment according to FIG. 9 is configured as a lever 51 and/or a lever device 51, the second force F2 exerted on the first subsection 11 (and/or on the second subsection 12) leading to an unlocking movement (and/or pulling back) of the bolt 6. The transmission device 50 is configured according to the embodiment according to FIG. 10 as a spring device 52, the second force F2 exerted on the first subsection 11 (and/or on the second subsection 12) in turn leading to an unlocking movement (and/or pulling back) of the bolt 6, by means of an abutment 53 in cooperation with the spring device 52.

Figures 11, 12:
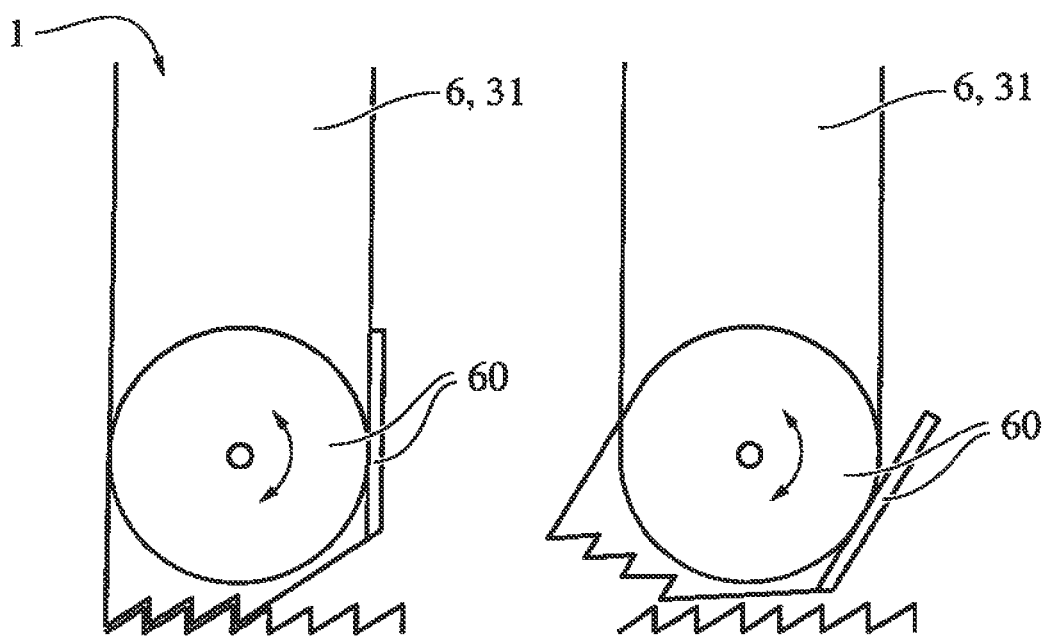

In FIGS. 11 and 12, a further alternative embodiment of the locking device 1 according to the invention is shown, the blocking device 30 and the sliding device 40 being implemented by means of a pivotable toothed segment 60. This pivotable toothed segment 60 is, for example, arranged on the bolt 6 and has a blocked position shown in FIG. 11 and a sliding position shown in FIG. 12. According to the invention, in this embodiment it is preferably provided that a spring means (not shown) pretensions the pivotable toothed segment 60 in its blocked position.

In FIGS. 18 and 19, further modifications of the locking device 1 according to the invention are shown. In this connection, the sliding device 40 is provided at the same time as a control device for controlling the movement of the bolt 6 and/or of the blocking pin 31. The sliding device 40 has, for example, a ball 45 mounted in a cage 46, between the second subsection 12 and the third subsection 13. A relative movement between the second subsection 12 and the third subsection 13 leads to a movement of the ball 45 in the cage 46. This movement effects by means of a lever mechanism 47 an unlocking movement and/or a pulling back of the bolt 6. The arrangement of the ball 45 between the second subsection 12 and the third subsection 13 is preferably provided on a radial external side of the second subsection 12.

Figure 20:
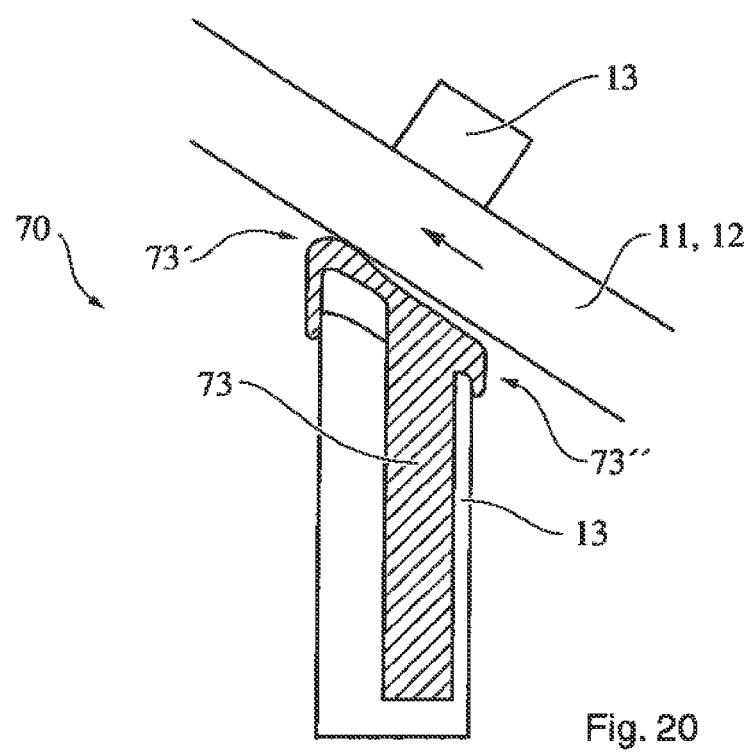
Figure 21:
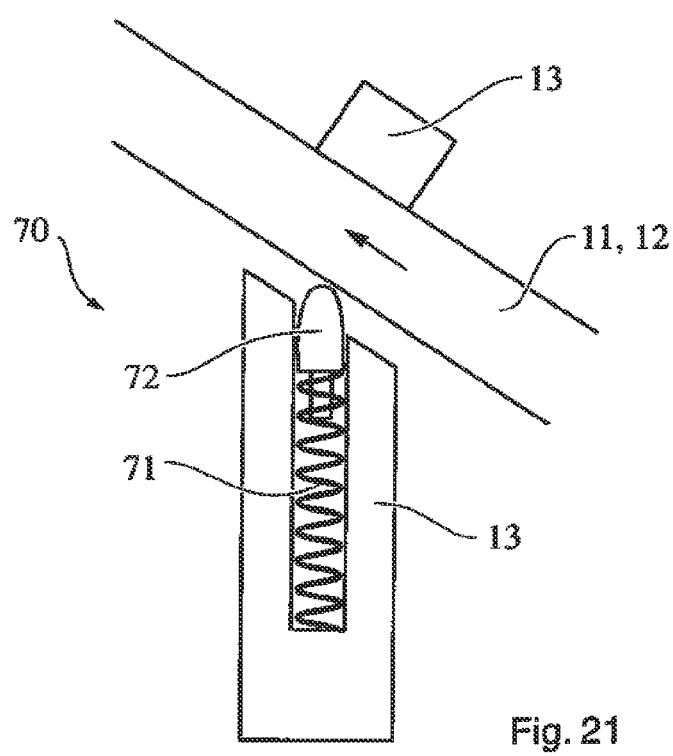
Figure 22:
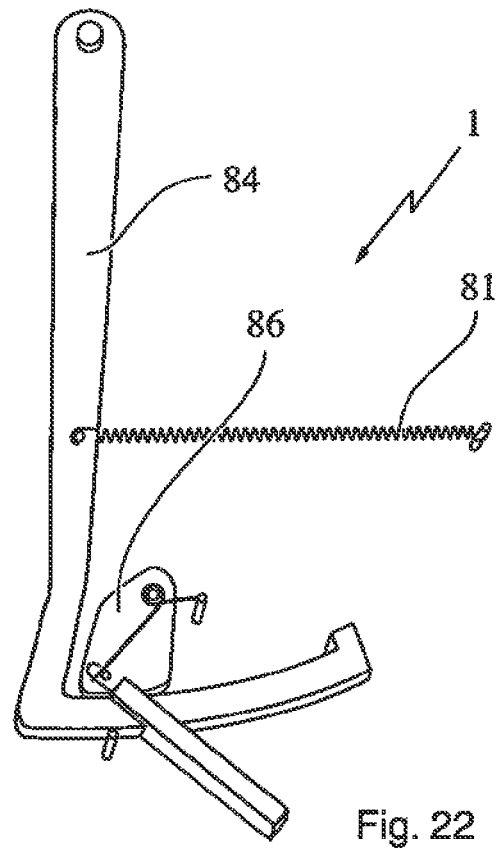
Figure 23:
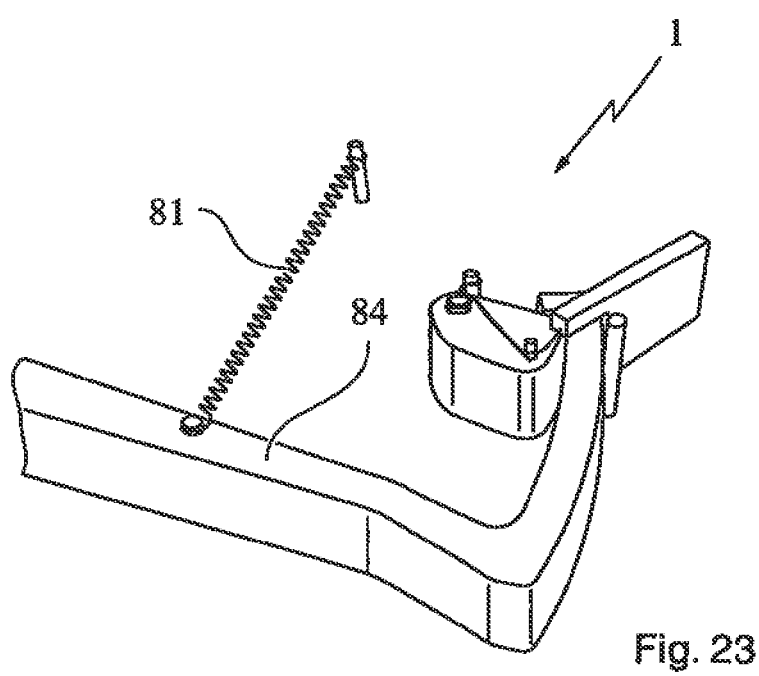
Figure 24:
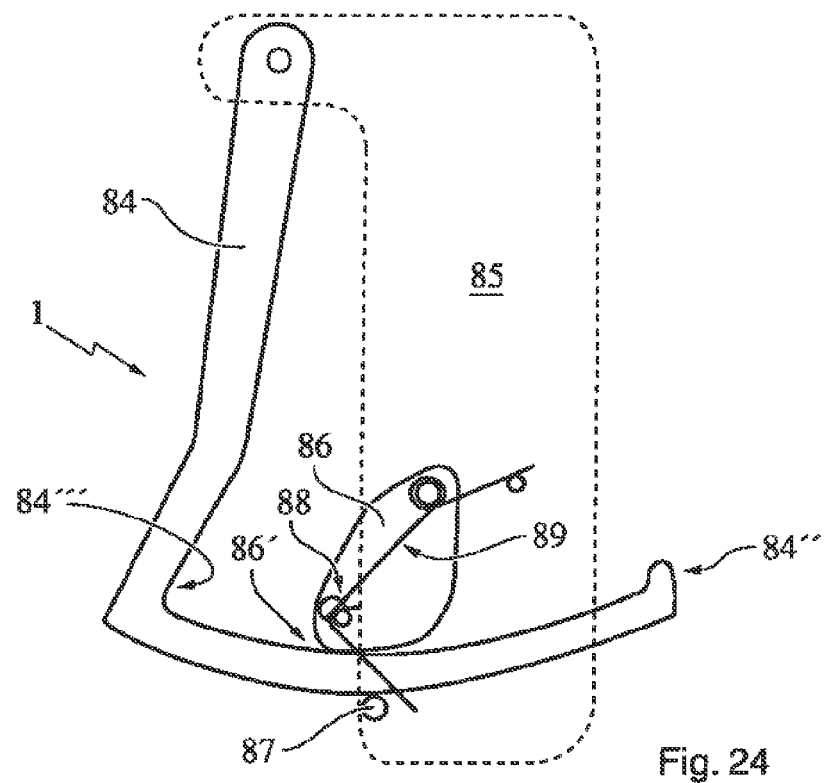
Figure 25:
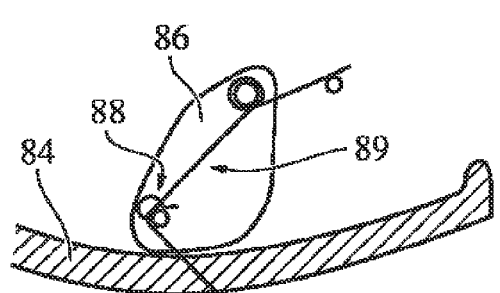
Figure 26:
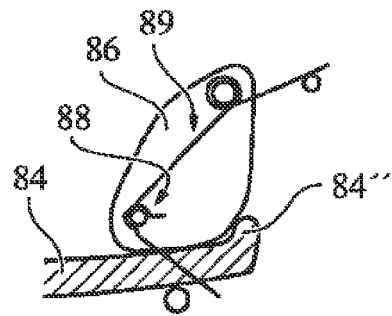

In the view according to FIGS. 20 and 21 it is shown how between the third subsection 13 and the first subsection 11 or between the third subsection 13 and the second subsection 12 in the axial direction (i.e. arranged opposing one another, substantially parallel to the direction of displacement) a sliding device may be produced in the sense of tolerance compensation and/or a tolerance compensating device 70. According to FIG. 21, the tolerance compensating device 70 is constructed such that between opposing parts of the one subsection—in the example of FIG. 21 of the third subsection 13—a further subsection—in the example of FIG. 21 the first and/or second subsection 11, 12—is guided and in that in one of the opposing parts of the one subsection (denoted here by 13) a tolerance spring element 71 and a tolerance sliding element 72 is arranged, so that by means of the tolerance spring element 71 the tolerance sliding element 72 is pressed against the other subsection (denoted here by 11, 12) and thus is guided by the compensation of tolerances. An alternative embodiment of such a tolerance compensation device 70 between the third subsection 13 and the first subsection 11 or between the third subsection 13 and the second subsection 12 is shown in FIG. 20. According to FIG. 20, the tolerance compensation device 70 is constructed so that between opposing parts of the one subsection—in the example of FIG. 20 of the third subsection 13—a further subsection—in the example of FIG. 20 the first and/or second subsection 11, 12—is guided and that in one of the opposing parts of the one subsection (denoted here by 13) a further tolerance spring element 73 is arranged, so that the further tolerance spring element 73 is pressed against the other subsection (denoted here by 11, 12) and thus is guided by the compensation of component tolerances. The further tolerance spring element 73 has a spring component 73' and a stop component 73". The spring component 73' is used for tolerance compensation and is dimensioned such that pressing against the respective other subsection (in this case 11, 12) takes place. The stop part 73" serves for minimizing noise in the event that one of the subsections 11, 12, 13 when adjusting the extreme position at the ends of the comfort adjustment region (and/or against the ends of the displacement path of the comfort adjustment) strikes against a further subsection. The further tolerance spring element 73 is generally produced from a material which is sufficiently elastic in order to minimize noise in such a case, so that a striking of "hard" parts of the subsections 11, 12, 13 against one another and the inherent noise generation is avoided.

FIGS. 22 to 26 show in various perspective views and/or side views an alternative possibility for adjusting the comfort of a crash-active head restraint. FIGS. 22 to 26 are described together hereinafter. Such a crash-active head restraint 4 has a fifth subsection 85 and a fourth subsection 84 (see in particular FIG. 24). The fifth subsection 85 is usually, i.e. during normal operation of the head restraint, adjusted in a normal position. In an accident situation, the fifth subsection 85 (relative, for example, to a further subsection not shown in FIG. 24 and/or relative to the remaining part of the head restraint) is moved in the direction of the head of the seat occupant. In front of the fifth subsection 85 (in the direction of the head of the seat occupant in front of the fifth subsection) a fourth subsection 84 is arranged which may be moved relative to the fifth subsection 85 for the purposes of comfort. The movement of the fourth subsection 84 relative to the fifth subsection 85 is possible between an initial position and an end position and is provided as a pivoting movement about a further rotational axis 84'. In this connection, the initial position corresponds to the adjustment furthest removed from the head of the seat occupant and the end position corresponds to the furthest adjustment of the fourth subsection 84 in the direction of the head of the seat occupant. According to the embodiment of the locking device 1 according to FIGS. 22 to 26, it is now provided that the relative adjustment of the fourth subsection 84 relative to the fifth subsection 85 between the initial position and the end position is possible in any setting and/or position. This is implemented by a clamping element 86, which is in frictional contact in a contact region 86' (see FIG. 24) with the fourth subsection 84, and presses the fourth subsection 84 against a counter element 87. A force impingement of the fourth subsection 84 in the direction of the initial position (to the right in FIG. 24, i.e. counterclockwise about the further rotational axis 84') due to a pivot point provided in the upper right part of the clamping element leads to a greater contact force in the contact region and thus to a locking of the fourth subsection 84 relative to a movement in the direction of the initial position. A spring element 81 (see in particular FIGS. 22 and 23) acts on the fourth subsection 84 in the direction of the initial position. Moreover, a further spring element 89 acts on the clamping element 86 such that (to the right in FIG. 24, i.e. counterclockwise about the pivot point of the clamping element 86 indicated in the upper right part of the clamping element, but not provided with a reference numeral) in the normal case a pressing and/or a frictional contact with the fourth subsection 84 is present. In this case, the clamping element 86 is adjusted in a clamped position. For returning the fourth subsection 84, it is provided that the clamping element 86 may be adjusted into a reset position (see FIG. 26). The adjustment of the reset position takes place, for example, by means of a retaining spring 88 which has an end bent in a substantially C-shaped manner, by means of which for example a pin of the clamping element 86 may be partially encompassed, so that the clamping element 86 is retained (against the action of force of the further spring element 89 and in the contact region 86' at a distance from the fourth subsection 84). The adjustment of the reset position (starting from the clamped position) takes place in the embodiment shown by a first stop element 84" of the fourth subsection 84 moving the clamping element 86 (clockwise in FIG. 24). The adjustment of the clamped position (starting from the reset position) takes place in the embodiment shown by a second stop element 84''' of the fourth subsection 84 moving the clamping element 86 (counterclockwise in FIG. 24).

The invention claimed is:

1. A locking device for a head restraint for a vehicle seat, comprising:
   a first subsection, which may be displaced from a use position in a direction of displacement into a comfort position; and
   a second subsection rotatable relative to the first subsection, a third subsection, or any combination thereof, about a rotational axis substantially parallel to the direction of displacement, wherein both a blocking device and a sliding device are arranged between the first subsection and the second subsection, between the second subsection and the third subsection, or any combination thereof; and
   a spring configured to provide a force threshold, wherein the spring urges at least one subsection away from at least one other subsection in the direction of displacement to enable the sliding device to facilitate rotation of the at least one subsection and the at least one other subsection relative to one another, and the blocking device is configured to block rotation of the at least one subsection and the at least one other subsection relative to one another in at least one rotational direction in response to application of a first force greater than the force threshold in a direction counter to the direction of displacement, and to otherwise facilitate rotation of the at least one subsection and the at least one other subsection relative to one another.

2. The locking device as claimed in claim 1, wherein the first subsection has at least one first oblique surface and the second subsection has at least one second oblique surface, the first oblique surface, the second oblique surface, or any combination thereof, extending substantially helically about the rotational axis and effecting a movement of the first subsection in the direction of displacement in response to rotation of the second subsection about the rotational axis.

3. The locking device as claimed in claim 2, wherein the second subsection is arranged between the first subsection and a third subsection, the third subsection comprising at least one third oblique surface and the second subsection comprising at least one fourth oblique surface, the third oblique surface, the fourth oblique surface, or any combination thereof, extending substantially helically about the rotational axis and effecting a movement of the second subsection in the direction of displacement in response to rotation of the second subsection about the rotational axis.

4. The locking device as claimed in claim 3, wherein the blocking device and the sliding device extend substantially adjacent to one another along the first oblique surface, along the second oblique surface, along the third oblique surface, along the fourth oblique surface, or any combination thereof.

5. The locking device as claimed in claim 4, wherein the blocking device and the sliding device extend adjacent to one another along a periphery about the rotational axis.

6. The locking device as claimed in claim 5, wherein the blocking device and the sliding device are provided offset in the axial direction relative to the rotational axis.

7. The locking device as claimed in claim 3, wherein the spring is provided in the region of the first oblique surface, in the region of the second oblique surface, in the region of the third oblique surface, in the region of the fourth oblique surface, or any combination thereof, on a side opposing the blocking device in the axial direction.

8. The locking device as claimed in claim 3, wherein the blocking device is provided for blocking or reducing a movement of the first subsection counter to the direction of displacement, the blocking device comprising a toothed portion in the region of the third oblique surface and the fourth oblique surface, a toothed portion in the region of the first oblique surface and the second oblique surface, or any combination thereof.

9. The locking device as claimed in claim 1, wherein the blocking device has at least one blocking pin.

10. The locking device as claimed in claim 9, wherein the blocking pin is preloaded by a spring.

11. The locking device as claimed in claim 1, wherein the first subsection as a result of an accident may be displaced from the use position in the direction of displacement into a safety position.

12. The locking device as claimed in claim 1, wherein the second subsection has a comfort subsection and a safety subsection, the comfort subsection being able to be moved away from a first position of the safety subsection for comfort adjustment starting from a second position, and the comfort subsection interacts with the first subsection to reach the use position.

13. The locking device as claimed in claim 12, wherein the comfort subsection is adjustable into a position corresponding to the safety position of the first subsection irrespective of the position of the safety subsection.

14. The locking device as claimed in claim 1, wherein between the first subsection and the second subsection, between the second subsection and the third subsection, or between the first subsection and the third subsection a tolerance compensation device is provided.

15. The locking device as claimed in claim 1, comprising:
   fourth and fifth subsections, the fifth subsection being able to be adjusted from a use position into a safety position, the fourth subsection being able to be rotated about a substantially horizontal rotational axis to interact with the fifth subsection, wherein the fourth subsection is displaceable for comfort purposes between an initial position and an end position; and
   a clamping element and a counter element provided to block the fourth subsection in any position between the initial position and the end position relative to a movement in the direction of the initial position.

16. The locking device as claimed in claim 15, wherein the clamping element may be adjusted into a clamped position and into a reset position, the clamping element in the clamped position effecting a clamping of the fourth subsection and the clamping element in the reset position permitting a return of the fourth subsection from the end position to the initial position.

17. The locking device as claimed in claim 16, wherein the reset position of the clamping element corresponds to a blocking by a retaining spring.

18. The locking device as claimed in claim 1, wherein the first subsection faces a head of a seat occupant, and the direction of displacement is provided in the direction of the head of the seat occupant.

* * * * *